E. G. LUENING.
WELDING TIP.
APPLICATION FILED MAR. 24, 1913.

1,107,429.
Patented Aug. 18, 1914.

Witnesses:
G. W. Domarus Jr.
R. Bauerle

Inventor:
Eugene G. Luening
By Samuel E. Darby
Atty

UNITED STATES PATENT OFFICE.

EUGENE G. LUENING, OF CHICAGO, ILLINOIS, ASSIGNOR TO DAVIS-BOURNONVILLE COMPANY, OF NEW YORK, N. Y., AND CHICAGO, ILLINOIS, A CORPORATION OF NEW YORK.

WELDING-TIP.

1,107,429.  Specification of Letters Patent.  Patented Aug. 18, 1914.

Application filed March 24, 1913. Serial No. 756,314.

*To all whom it may concern:*

Be it known that I, EUGENE G. LUENING, a citizen of the United States, residing at Chicago, county of Cook, State of Illinois, have made a certain new and useful Invention in Welding-Tips, of which the following is a specification.

This invention relates to welding tips.

The object of the invention is to provide a construction of tips used for oxy-acetylene or other gas mixture welding purpose which is simple, efficient and economical, and wherein a uniformly neutral flame is maintained while the tip is in use.

A further object is to provide a tip of the class referred to which may be maintained cool while in operation.

In the restricted sense, a further object is to provide a water-cooled tip of the nature referred to.

The invention consists substantially in the construction, combination, location and relation of parts, all as will be more fully set forth, as shown in the accompanying drawing, and finally pointed out in the appended claims.

Figure 1:
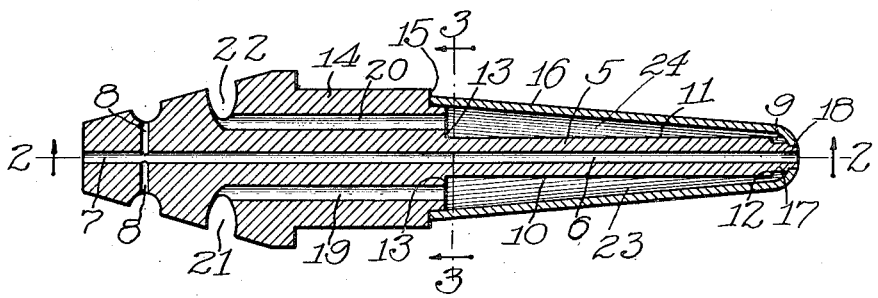
Figure 2:
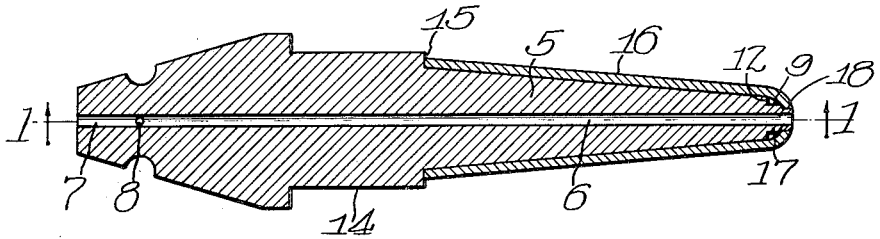
Figure 3:
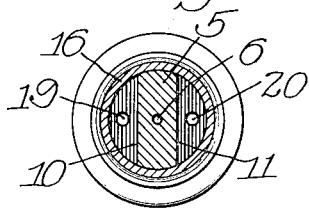

Referring to the accompanying drawing,—Figure 1 is a view in central longitudinal section on the line 1, 1, Fig. 2, showing a welding tip embodying the principles of my invention. Fig. 2 is a similar view on the line 2, 2, Fig. 1. Fig. 3 is a view in transverse section of the same on the line 3, 3, Fig. 1.

In the use of tips for welding and similar purposes it is important, in order to attain the best results, to maintain a uniformly neutral flame, that is, a flame that is produced by just exactly the proper proportion of oxygen and acetylene, or of other gases, as the case may be, to secure complete combustion. The use of such tips develops intense heat at the end of the tip where the flame is maintained which heat, of course, is conducted to the body of the tip and heats the constituent gases employed in producing and maintaining the flame with the result that the gas mixture varies with variations in the heat to which they are thus subjected, and hence there is a variation in the flame. In order to overcome this objection I propose, in accordance with my invention, to provide means for maintaining the tip body cool during the time the tip is in use, and to this end, in the specific embodiment of my invention which I have selected to illustrate the principles involved. I provide a jacket for the body of the tip and so construct and arrange the parts as to form a channel way or space on each side of the tip body which communicate with each other at one end of the tip body, and through which a cooling medium, such, for example, as water may be circulated and which serves to maintain the tip body cool, the gas mixture uniform and the flame steady and constant.

In the drawing reference numeral 5, designates the tip body having the central longitudinal bore 6, through which the mixed gases flow to the end of the tip where the flame is produced and maintained. The constituent gases are admitted to the bore 6 through the openings 7, 8, respectively. At its extreme end the tip body is circumferentially reduced in diameter for a short distance, as shown, to form an annular channel 9. The body of the tip 5 is milled off on opposite sides thereof, as indicated at 10, 11, Figs. 1 and 3, the milled off portions extending from the flame end of the tip, or the shoulder 12, thereof which is formed by turning down the end of the tip body to produce the annular channel 9, along the tip body toward the opposite end thereof to the desired extent, and they terminate in a shoulder 13 formed on an enlarged part 14 of the tip. This enlarged part is itself turned down or reduced in external diameter to form a shoulder 15.

In practice the body of the tip from the shoulder 13, to the shoulder 12, that is the milled portion of the tip is made longitudinally tapered. Fitted over the milled portion of the tip body is a cap or sleeve 16, tapered to correspond to the taper of the tip body, one end being received against the shoulder 15, the joint at this point being soldered, or otherwise securely sealed and the other end fitting tightly over the extreme end of the reduced portion 17 of the tip, and soldered thereto or otherwise securely sealed at this point, said cap or sleeve having a hole or opening 18 therethrough to fit the extreme end of the tip body, the flame being maintained at the outer end surface of the cap. The enlarged portion 14 of the tip body has the passages 19, 20, drilled therethrough from the shoulder 13, to openings 21, 22, respectively, on opposite sides of the tip body. The cap or sleeve 16, is made to fit tightly over those portions of the exterior surface of the tip body which have not been milled, but chambers 23, 24, are left respectively on opposite sides of the tip body between the same and the cap or sleeve. It will be seen that these chambers are thus made to communicate respectively, at one end with the ports or openings 21, 22, while at their other ends said chambers are in communication with each other through the annular channel 9. This affords a very simple, efficient and economical structure for permitting a cooling medium to be circulated around the body of the tip, such medium entering the port or opening 21, for instance and passing through channel 19, chamber 23, channel 9, chamber 24, channel 20 and port 22, and enables me to thus maintain the tip body cool while in use, thereby maintaining the gas mixture, uniform and the flame steady and constant.

Having now set forth the object and nature of my invention and a construction embodying the principles thereof, what I claim as new and useful, and of my own invention, and desire to secure by Letters Patent is—

1. In a welding tip, a tip body having a longitudinal central passage therethrough for the flame gases, and auxiliary longitudinal passages respectively arranged on opposite sides of the central passage, for a cooling medium, and a jacket surrounding a portion of the tip body and coöperating with said body portion to form separate chambers with which said auxiliary passages respectively communicate, said chambers communicating with each other at the tip end of said body portion.

2. In a welding tip, a body having a longitudinal passage therethrough, said tip being reduced in thickness on opposite sides thereof, and a jacket for said body forming separated chambers on the reduced sides of said body, said chambers communicating with each other at one end, and inlet and outlet openings respectively communicating with said chambers at their other ends.

3. In a welding tip, a body having a gas passage longitudinally therethrough, and reduced at the end thereof, said body having the opposite sides thereof cut away, and a jacket for said body, said jacket inclosing the reduced end and cut away side portions of the body to form separated chambers and an annular passage communicating therebetween, said body having inlet and outlet openings for a cooling medium respectively communicating with said chambers.

4. In a welding tip, a body having an enlarged part formed with inlet and outlet ducts, opposite sides of said body being cut away, the end of said body being reduced in diameter, and a jacket fitting over the reduced end and cut away side portions of the tip, to form separated intercommunicating chambers, said ducts respectively communicating with said chambers.

5. In a welding tip a body having an enlarged part with inlet and outlet ducts formed therein, said enlarged part reduced to form a peripheral shoulder, the opposite sides of the body being cut away from said shoulder to the end of the body, and a jacket circular in cross section fitting over the cut away side portions of the body and secured to said shoulder, the body being reduced at its extremity to form an annular channel.

In witness whereof I have hereunto set my hand this 14th day of March, 1913, in the presence of the subscribing witnesses.

EUGENE G. LUENING

Witnesses:
LEMUEL M. SHIELDS,
ERNEST H. JOHNSON.